E. HUMBERT.
MELTING FERROMANGANESE.
APPLICATION FILED JULY 18, 1913.
1,101,551.
Patented June 30, 1914.
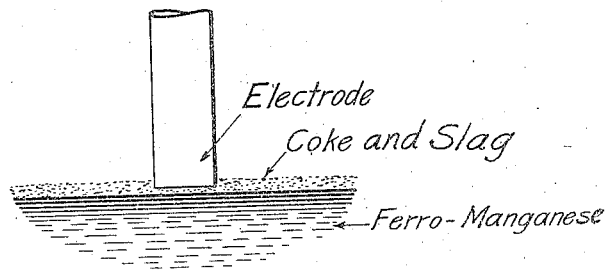

UNITED STATES PATENT OFFICE.

ERNEST HUMBERT, OF CHICAGO, ILLINOIS.

MELTING FERROMANGANESE.

1,101,551.

Specification of Letters Patent.

Patented June 30, 1914.

Application filed July 18, 1913. Serial No. 779,777.

*To all whom it may concern:*

Be it known that I, ERNEST HUMBERT, a citizen of the Republic of France, residing in Chicago, Illinois, have invented new and useful Improvements in Melting Ferromanganese, of which the following is a specification.

In order to provide molten ferro-manganese for use in steel making it is customary to maintain a continuous supply of the same in molten condition in an electric furnace, withdrawing a small quantity from the electric furnace for use in the steel every few minutes and simultaneously adding a corresponding quantity of cold ferro-manganese to the bath in the electric furnace. This invention provides an economical method of melting the ferro-manganese for this or other similar uses. I attain the desired advantages by providing a covering of carbonaceous material for the bath of molten ferro-manganese. The process is particularly advantageous where the electric furnace is of the electrode type, such as the well known Heroult electrode furnace; using in this case a layer of coke of about nut size, and two or three inches thick so as to surround the lower ends of the electrodes.

An example of the process is as follows. In starting the furnace the ferro-manganese is charged either cold or preheated and on top of this is applied a layer of coke, nut size, two or three inches thick. The electrodes are then lowered and the current started. When the ferro-manganese is melted the coke floats on the top of the same. As the coke burns away the supply must be renewed, a shovel full or two from time to time in order to maintain substantially the same thickness of coke on the bath. In this way there is consumed about a wheelbarrow full every day for a furnace melting ten tons of ferro-manganese per day. A small quantity of slag consisting of lime and sand or fluor spar is added in order to flux the impurities of the coke (chiefly sulfur), about 150 pounds of such slag being added every twenty-four hours.

The accompanying drawing illustrates the process, the single figure being a diagrammatic vertical sectional view.

In melting ferro-manganese without the provision of this covering of coke certain difficulties are present. The high temperature of the arc tends to volatilize the manganese and cause a loss in this way. Consequently, a lower voltage is used than in similar furnaces working on steel. For example, where one hundred volts are used in melting steel this should be reduced to seventy volts or less when melting ferro-manganese. This low voltage involves an increased cross-section of the copper bars and cables to carry the extra amperes to the furnace, which means a very substantial increase in the cost of the installation. Again the low voltage means a short arc, and every six minutes or so when the furnace is tapped and cold ferro-manganese is added a rising and falling of the surface of the bath is caused which is quite substantial in comparison with the length of the arc so that large variations in current are caused; and sometimes the metal comes into contact with an electrode and produces a short circuit which makes trouble at the power station. In my process the electrodes are in contact with the coke so that the furnace is working on resistance with small arcs between the pieces of coke. For this reason a voltage as high as that used in steel melting (and even higher by increasing the thickness of the covering of the coke) may be used without producing substantial variations in the quantity of current and without danger of short circuits. Furthermore, in my process there are no arcs above the material under treatment and the banks and roof of the furnace do not deteriorate so rapidly as in previous processes. The saving of copper in the conductors and transformers by the use of a higher voltage is very important, effecting a large saving in the cost of the installation.

Each time that cold ferro-manganese is charged, the doors of the furnace are opened and a certain quantity of air is admitted to the furnace which, under the old methods, cools the furnace and oxidizes the slag and the ferro-manganese. This charging operation is repeated several times per hour and, therefore, means the addition of a considerable quantity of current in order to replace the heat loss. In my process the coke is maintained at a white heat and every time that the doors are opened the air which enters oxidizes a portion of the coke with evolution of heat; so that instead of being cooled the bath is heated by this addition of air, and oxidation of the ferromanganese by exposure to the air is prevented.

What I claim is—

1. In the melting of ferro-manganese in an electric furnace, the maintaining of a covering layer of carbonaceous material upon the ferro-manganese while molten.

2. Maintaining a supply of ferro-manganese molten in an electric furnace, withdrawing small quantities of the molten metal from time to time and replacing it with corresponding quantities of solid metal and maintaining a covering of carbonaceous material on the molten bath to protect the same from direct exposure to air when the furnace is opened and to cause a consumption of carbon and the generation of additional heat at such times.

3. Maintaining a supply of ferro-manganese molten in an electric furnace of the electrode type, and providing a covering of carbonaceous material for the metal, said covering extending about the ends of the electrodes to permit slight variations of the surface of the metal without material variations in voltage.

4. Maintaining a supply of ferro-manganese molten in an electric furnace of the electrode type, withdrawing small quantities of the molten metal from time to time and replacing them with corresponding quantities of solid metal and maintaining a comparatively thick covering of carbonaceous material on the bath and surrounding the ends of the electrodes so as to avoid excessive variations in voltage when the surface of the bath is agitated and so as to protect the bath from direct contact with air when the furnace is opened and cause a consumption of carbon and a consequent addition of heat at such times.

In witness whereof, I have hereunto signed my name in the presence of two subscribing witnesses.

ERNEST HUMBERT.

Witnesses:
D. ANTHONY USINA,
LULU STUBENVOLL.